United States Patent [19]

Carroll et al.

[11] 4,318,665
[45] Mar. 9, 1982

[54] MACHINING CENTER WITH TOOL SHUTTLE

[75] Inventors: Richard R. Carroll, Chagrin Falls; Alan M. Papp, Eastlake, both of Ohio

[73] Assignee: Litton Industrial Products, Inc., Cleveland, Ohio

[21] Appl. No.: 119,375

[22] Filed: Feb. 7, 1980

[51] Int. Cl.³ .......................... B23Q 3/157; B25J 5/02
[52] U.S. Cl. ..................... 414/728; 29/568; 105/29 R; 414/736; 414/751
[58] Field of Search ................ 29/568; 414/735, 751, 414/728, 736; 105/29 R; 104/119

[56] References Cited

U.S. PATENT DOCUMENTS

| | | | |
|---|---|---|---|
| 3,262,593 | 7/1966 | Hainer | 105/29 R X |
| 3,268,095 | 8/1966 | Durbin | 105/29 R X |
| 3,922,970 | 12/1975 | Glastra | 105/29 R X |

FOREIGN PATENT DOCUMENTS 11882  6/1980  European Pat. Off. .............. 29/568

*Primary Examiner*—Z. R. Bilinsky
*Attorney, Agent, or Firm*—Spencer T. Smith

[57] ABSTRACT

A tool changing mechanism for a machining center comprising arcuate shuttle path means including rail means having a uniform width with opposing sides and a gear track parallel to the rail, and a tool shuttle including a tool change arm, shuttle path engagement means including post means, means for mounting the post means on the tool shuttle for selective rotation about a vertical axis, a pair of guide rollers, means for mounting the pair of guide rollers on the post means with a selected spacing therebetween substantially equal to the rail width, whereby the pair of guide rollers will engage the opposing rail sides and selectively change their orientation to automatically maintain an orthogonal relation thereto while the shuttle traverses the arcuate shuttle path, a driven gear concentrically mounted for rotational movement relative to the post means about the post rotational axis and for engagement with the gear track, and means for driving the driven gear, whereby the shuttle may traverse the arcuate shuttle path maintaining the gear in continuous driving engagement with the gear track while the orientation of the guide rollers changes maintaining continual orthogonal engagement with the opposing rail sides.

8 Claims, 2 Drawing Figures

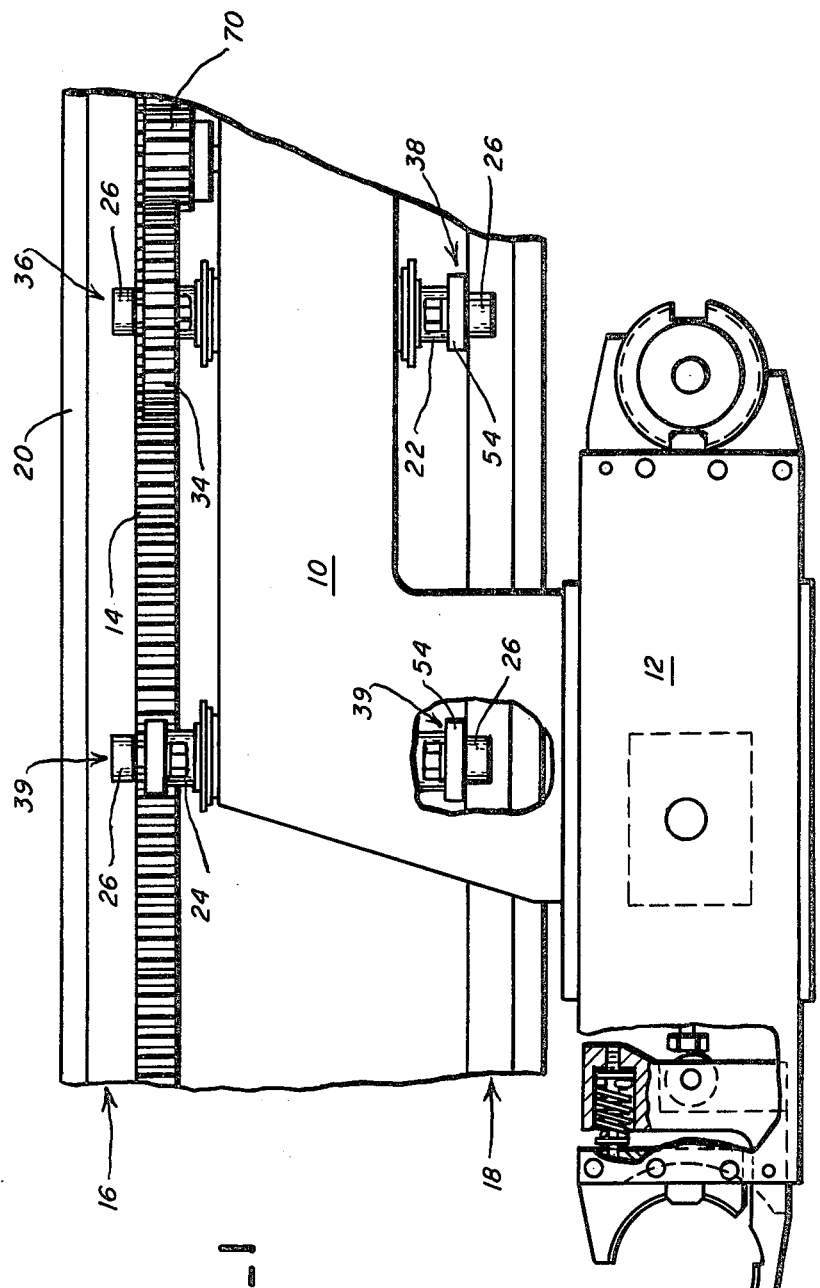

Fig_2

MACHINING CENTER WITH TOOL SHUTTLE

A machining center is a machine tool having a rotatable tool spindle and a tool changing and storing mechanism for storing a plurality of individually utilized tools and for sequentially transferring tools to and from the machine tool spindle. Such tool changing mechanisms may, as in the case of the present invention, include a tool shuttle when the storage device is located at a remote location.

Machining centers are known in the prior art which include a tool shuttle capable of traversing a linear track. The location of the tool storage device is inherently limited in such structures. This is an undesirable design limitation. The present invention teaches a tool shuttle which is capable of traversing both linear and curved paths. Accordingly, the tool storage device may be placed at any location.

It is, accordingly, an object of the instant invention to provide a tool changing mechanism including a tool shuttle which is capable of transporting tools to and from a remote location along an arcuate path.

Other objects and advantages of the present invention will become apparent from the following portion of the specification and from the accompanying drawings which illustrate, in accordance with the mandate of the patent statutes, a presently preferred embodiment incorporating the teachings of the invention.

Referring to the drawings,

FIG. 1 is a front elevational view of a tool changing mechanism of a machining center; and FIG. 2 is an exploded, perspective view of the driven support member of the tool shuttle.

The disclosed machining center includes a tool shuttle 10 having a tool change mechanism 12. The shuttle path is defined by a gear track 14 and upper and lower rails 16 and 18, all of which are mounted in parallel on a support beam 20. The shuttle is mounted on the shuttle path utilizing two posts 22 and 24 with guide rollers 26 and wheels 28 mounted on opposite ends of each post which engage the opposing sides 30 and crowns 32 of the upper and lower rails 16 and 18, and with a driven gear 34 mounted about one of the post ends which engages the gear track 14.

FIG. 2 discloses the detailed structure of the right post 22 having an upper end 36 on which the driven gear 34 is mounted and a lower end 38. This post is rotatably supported within a shuttle sleeve 40 and is maintained in a fixed axial position by two C-rings 42 which are secured within suitable circumferential post grooves 44 and engage washers 46 located between the ends of the sleeve 40 and the C-rings 42. Each end of the post is selectively slotted to receive a wheel 28 and includes appropriate bores 48 substantially the same size as the axial bores 50 of the wheels 28. The guide roller mount, which comprises a disc 52 in the upper end 36 and a bar 54 in the lower end 38, has a central vertical bore 56 for matingly receiving one of the post ends, an intersecting horizontal bore 58 substantially the same size as the end bores 48, and vertical bores 62, one on either side of the central vertical bore 56, which intersect the horizontal bore 58 for receiving a spaced pair of guide roller shafts 64 having guide rollers 36 secured at one end. The spacing between the vertical bores 62 for the guide roller shafts 64 is selected to allow the pair of guide rollers 26 to be spaced a distance substantially equal to the width of the rails for orthogonal engagement with the opposing rail sides 30.

In assembling each end, a guide roller mount 52 or 54 is positioned about a slotted post end and a wheel 28 is positioned in the post end slot with the horizontal bores 48, 50, 58 in alignment. Pin 60 is then inserted to rotatably support the wheel and to secure the guide roller mount to the post. Guide roller shafts 64 are inserted into the shaft holes 62 and secured by nut 66 confining the pin 60 therebetween and thereby maintaining the pin in position. On the upper end 36, a circumferential bearing 68 is mounted about the roller mount disc 52 to rotate about the same axis on which the post 22 pivots, thereby allowing the gear 34 to move relative to both the post 22 and the tool shuttle 10. The other post 24 has two ends 39 which are identical to the lower end 38.

In operation, the reversible gear drive 70 drives the driven gear 34 along the gear track 14 propelling the shuttle 10. When an arcuate portion 72 of the path is traversed, the posts 22 and 24 will pivot in response to the changing contour of the shuttle path to maintain an orthogonal relationship between the pairs of guide rollers 26 and the opposing rail sides 30. Since the driven gear 34 rotates about the post pivot axis, it remains properly engaged with the gear track 14 while the shuttle 10 traverses the arcuate path.

We claim:

1. A tool changing mechanism for a machining center comprising
    arcuate shuttle path means including rail means having a uniform width with opposing sides and a gear track parallel to said rail means, and
    a tool shuttle including
        a housing,
        a tool change arm secured to said housing,
        shuttle path engagement means including
        post means,
            means for mounting said post means on said housing for selective rotation about a vertical axis,
            a pair of guide rollers having vertical axes,
            means for mounting said pair of guide rollers on said post means for engaging said opposing rail sides and concentrically located about said post axis so that said guide rollers can selectively change their orientation to automatically maintain an orthogonal relation thereto while said shuttle traverses said arcuate shuttle path,
            a driven gear concentrically mounted on said post means for rotational movement relative to said post means and for engagement with said gear track, and
        means for driving said driven gear, whereby said shuttle may traverse the arcuate shuttle path maintaining said gear in continuous driving engagement with said gear track while the orientation of said guide rollers changes maintaining continual orthogonal engagement with the opposing rail sides.

2. A tool changing mechanism according to claim 1, wherein said rail means additionally includes a crown, and wherein said post means further comprises wheel means and means for mounting said wheel means for rolling engagement with said rail crown.

3. A tool changing mechanism according to claim 1 or 2, wherein said guide roller mounting means includes a disc having a circumferential bearing on which said driven gear is mounted.

4. A tool changing mechanism for a machining center comprising arcuate shuttle path means including an upper arcuate rail having a uniform width with opposing sides, a lower parallel rail having a uniform width with opposing sides, and a parallel gear track, and a tool shuttle including a tool change arm, shuttle path engagement means including a pair of posts, each having a top end and a bottom end, means for mounting each of said posts on said tool shuttle for selective rotation about a vertical axis, four pairs of guide rollers, means for mounting one of said pairs of guide rollers on each of said post ends with a selected spacing therebetween substantially equal to the width of said upper or lower rails for rolling engagement with the opposing rail sides, whereby said pair of guide rollers selectively change their orientation to automatically maintain an orthogonal relation with their respectively engaged opposing rail sides while said shuttle traverses said arcuate shuttle path, a driven gear concentrically mounted about one of said post rotational axes for rotational movement relative to that said post and for engagement with said gear track, and means for driving said driven gear, whereby said shuttle may traverse the arcuate shuttle path maintaining said gear in continuous driving engagement with said gear track while the orientation of said guide rollers changes maintaining continual orthogonal engagement with their respective opposing rail sides.

5. A tool changing mechanism according to claim 4, wherein said upper and lower rails each additionally includes a crown, and wherein said upper and lower post ends each further comprises wheel means and means for mounting said wheel means for rolling engagement with their respective rail crown.

6. A tool changing mechanism according to claim 4 or 5, wherein said guide roller mounting means on one of said post ends includes a disc having a circumferential bearing on which said driven gear is mounted.

7. A tool changing mechanism according to claim 6, wherein said disc comprises one of said upper post end guide roller mounting means.

8. A tool changing mechanism for a machining center comprising shuttle path means including rail means having a uniform width with a crown and opposing sides, and a tool shuttle including a tool change arm, shuttle path engagement means including post means having a slotted end having a selected bore extending perpendicularly therethrough, a wheel having a selected axial bore, a pair of guide rollers, each having an axial shaft;

a guide roller mounting element having a central bore for matingly engaging with said slotted end, a selected second bore perpendicular to and intersecting said central bore, and two opposing bores parallel to said central bore which intersect said second bore for receiving said guide roller shafts, a selectively sized pin for insertion into the aligned mounting element second bore, slotted post end bore, and wheel axial bore and being of a length selected so that said guide roller shafts comprise means for maintaining said pin positioned within said aligned bores, whereby said wheel is rotatably mounted on said pin and whereby said mounting element is secured to said post end by said pin.

* * * * *